United States Patent
Laksono

(10) Patent No.: US 7,707,485 B2
(45) Date of Patent: Apr. 27, 2010

(54) SYSTEM AND METHOD FOR DYNAMIC TRANSRATING BASED ON CONTENT

(75) Inventor: Indra Laksono, Richmond Hill (CA)

(73) Assignee: VIXS Systems, Inc., Toronto, Ontario (CA)

( * ) Notice: Subject to any disclaimer, the term of this patent is extended or adjusted under 35 U.S.C. 154(b) by 1246 days.

(21) Appl. No.: 11/237,435

(22) Filed: Sep. 28, 2005

(65) Prior Publication Data

US 2007/0074097 A1    Mar. 29, 2007

(51) Int. Cl.
*G06F 17/00*    (2006.01)
*H04N 7/10*    (2006.01)

(52) U.S. Cl. .................... 715/201; 715/255; 725/32
(58) Field of Classification Search ............ 715/255, 715/201; 725/32
See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,253,056 A | 10/1993 | Puri | |
| 5,475,434 A | 12/1995 | Kim | |
| 5,563,950 A | 10/1996 | Easter et al. | |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,844,545 A | 12/1998 | Suzuki et al. | |
| 5,850,443 A | 12/1998 | Van Oorschot et al. | |
| 5,940,130 A | 8/1999 | Nilsson et al. | |
| 5,969,755 A * | 10/1999 | Courtney | 348/143 |
| 5,996,029 A | 11/1999 | Sugiyama et al. | |
| 6,005,623 A | 12/1999 | Takahashi et al. | |
| 6,005,624 A | 12/1999 | Vainsencher | |
| 6,014,694 A | 1/2000 | Aharoni et al. | |
| 6,040,863 A | 3/2000 | Kato | |

(Continued)

FOREIGN PATENT DOCUMENTS

EP    0661826 A2    7/1995

(Continued)

OTHER PUBLICATIONS

Drucker, Steven M., et al, "SmartSkip: Consumer Level Browsing and Skipping of Digital Video Content", CHI '02: Proceedings of the SIGCHI Conference on Human Factors in Computing Systems, Apr. 2002, pp. 219-226.*

(Continued)

*Primary Examiner*—Laurie Ries

(57) ABSTRACT

Exemplary techniques for modifying multimedia data based on content are disclosed. One technique comprises determining whether a first portion of multimedia content of multimedia data has a first content characteristic and performing one or more content actions associated with the first content characteristic when the first portion of the multimedia content is determined to have the first content characteristic, wherein the one or more content actions modify a first portion of the multimedia data associated with the first portion of the multimedia content.

18 Claims, 3 Drawing Sheets

U.S. PATENT DOCUMENTS

| | | | |
|---|---|---|---|
| 6,081,295 A | 6/2000 | Adolph et al. | |
| 6,141,693 A | 10/2000 | Perlman et al. | |
| 6,144,402 A | 11/2000 | Norsworthy et al. | |
| 6,167,084 A | 12/2000 | Wang et al. | |
| 6,182,203 B1 | 1/2001 | Simar, Jr. et al. | |
| 6,215,821 B1 | 4/2001 | Chen | |
| 6,219,358 B1 | 4/2001 | Pinder et al. | |
| 6,222,886 B1 | 4/2001 | Yogeshwar | |
| 6,236,683 B1 | 5/2001 | Mougeat et al. | |
| 6,259,741 B1 | 7/2001 | Chen et al. | |
| 6,263,022 B1 | 7/2001 | Chen et al. | |
| 6,285,818 B1* | 9/2001 | Suito et al. | 386/46 |
| 6,300,973 B1 | 10/2001 | Feder et al. | |
| 6,307,939 B1 | 10/2001 | Vigarie | |
| 6,314,138 B1 | 11/2001 | Lemaguet | |
| 6,323,904 B1 | 11/2001 | Knee | |
| 6,366,614 B1 | 4/2002 | Pian et al. | |
| 6,385,248 B1 | 5/2002 | Pearlstein et al. | |
| 6,438,168 B2 | 8/2002 | Arye | |
| 6,480,541 B1 | 11/2002 | Girod et al. | |
| 6,526,099 B1 | 2/2003 | Christopoulos et al. | |
| 6,549,561 B2 | 4/2003 | Crawford | |
| 6,584,509 B2 | 6/2003 | Putzolu | |
| 6,714,202 B2 | 3/2004 | Dorrell | |
| 6,724,726 B1 | 4/2004 | Coudreuse | |
| 6,744,729 B2* | 6/2004 | Tinsley et al. | 370/229 |
| 6,748,020 B1 | 6/2004 | Eifrig et al. | |
| 6,760,916 B2* | 7/2004 | Holtz et al. | 725/34 |
| 6,874,160 B1* | 3/2005 | Herz | 725/58 |
| 7,080,392 B1* | 7/2006 | Geshwind | 725/34 |
| 7,143,353 B2* | 11/2006 | McGee et al. | 715/723 |
| 7,232,948 B2* | 6/2007 | Zhang | 84/600 |
| 7,284,202 B1* | 10/2007 | Zenith | 715/744 |
| 2001/0026591 A1 | 10/2001 | Keren et al. | |
| 2002/0009289 A1* | 1/2002 | Morishita et al. | 386/83 |
| 2002/0073424 A1* | 6/2002 | Ward et al. | 725/42 |
| 2002/0106022 A1 | 8/2002 | Takahashi et al. | |
| 2002/0110193 A1 | 8/2002 | Kyoon et al. | |
| 2002/0138259 A1 | 9/2002 | Kawahara | |
| 2002/0145931 A1 | 10/2002 | Pitts | |
| 2002/0176702 A1* | 11/2002 | Frantz | 386/108 |
| 2002/0196851 A1 | 12/2002 | Arnaud | |
| 2003/0093661 A1 | 5/2003 | Loh et al. | |
| 2003/0120831 A1* | 6/2003 | Dubil et al. | 710/8 |
| 2003/0123841 A1* | 7/2003 | Jeannin | 386/46 |
| 2003/0149559 A1* | 8/2003 | Lopez-Estrada | 704/200.1 |
| 2003/0152148 A1 | 8/2003 | Laksono | |
| 2003/0182620 A1 | 9/2003 | Errico et al. | |
| 2003/0202773 A1* | 10/2003 | Dow et al. | 386/46 |
| 2003/0210889 A1* | 11/2003 | Engle et al. | 386/46 |
| 2003/0229900 A1* | 12/2003 | Reisman | 725/87 |
| 2004/0010806 A1* | 1/2004 | Yuen et al. | 725/136 |
| 2004/0024790 A1* | 2/2004 | Everett | 707/200 |
| 2004/0109094 A1* | 6/2004 | Lindsay et al. | 348/739 |
| 2004/0125877 A1* | 7/2004 | Chang et al. | 375/240.28 |
| 2004/0187159 A1* | 9/2004 | Gaydos et al. | 725/92 |
| 2005/0022252 A1* | 1/2005 | Shen | 725/135 |
| 2005/0108643 A1* | 5/2005 | Schybergson et al. | 715/713 |
| 2005/0123001 A1* | 6/2005 | Craven et al. | 370/486 |
| 2005/0265395 A1* | 12/2005 | Kim et al. | 370/485 |
| 2005/0276567 A1* | 12/2005 | Okuyama et al. | 386/46 |
| 2006/0015904 A1* | 1/2006 | Marcus | 725/46 |
| 2006/0080591 A1* | 4/2006 | Huang et al. | 715/500.1 |
| 2006/0153522 A1* | 7/2006 | Iggulden | 386/83 |
| 2006/0238656 A1* | 10/2006 | Chen et al. | 348/731 |
| 2007/0279494 A1* | 12/2007 | Aman et al. | 348/169 |
| 2008/0162623 A1* | 7/2008 | Flynn et al. | 709/202 |
| 2009/0046873 A1* | 2/2009 | Riedl | 381/107 |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| EP | 1274238 A | 1/2003 |
| GB | 2396050 A | 6/2004 |
| JP | 07-210670 A | 8/1995 |
| WO | WO 01/95633 A2 | 12/2001 |
| WO | WO 02/080518 A2 | 10/2002 |

OTHER PUBLICATIONS

Wen-Nung Lie et al.: "Combining Caption and Visual Features for Semantic Event Classification of Baseball VIdeo" Multimedia and Expo, 2005. ICME 2005. IEE International Conference on Amsterdam, The Netherlands Jul. 6, 2005, Piscataway, NJ, USA, IEEE, Jul. 6, 2005, pp. 1254-1257, XP010843893, ISBN: 0-7803-0331-7 *the whole document*.

European Patent Office Search Report, Jun. 22, 2007, 6 pages.

European Patent Office Exam Report, Feb. 19, 2008, 6 pages.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc__id=OEG2003061S0070> retrieved Jul. 8, 2003.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Aggarwal, Manoj et al., "Efficient Huffman Decoding," 2000 IEEE, 0-7803-6297-7, pp. 936-939, University of Illinois at Urbana-Champaign, Urbana, IL.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al.,"On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation,"

Real-Time Imaging, Academic Press Ltd., vol. 56, No. 5, Oct. 2000, pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, March 2000, pp. 1-380, XP000861688.

Liu, Julia J., "ECE497KJ Course Project: Applications of Wiener Filtering In Image and Video De-Noising," pp. 1-15, May 21, 1997.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"CONEXANT Products & Tech Info: Product Briefs: CX24108," 2000-2002 Conexant Systems, Inc. access on Apr. 20, 2001.

"CONEXANT Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"ICE Fyre Semiconductor: IceFyre 5-GHz OFDM Modem Solution," Sep. 2001, pp. 1-6, ICEFYRE: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

SYSTEM AND METHOD FOR DYNAMIC TRANSRATING BASED ON CONTENT

FIELD OF THE DISCLOSURE

The present disclosure relates generally to data processing and more particularly to processing multimedia information.

BACKGROUND

Current trends in multimedia content distribution are directed to the storage of multimedia content for subsequent access or distribution. Presently, many households utilize personal video recorders (PVRs), also referred to as digital video recorders (DVRs) to store multimedia content received from a terrestrial broadcast as digital data. This data then may be accessed at a later date for display or transmission to another device, such as a cell phone or a portable video player. Current multimedia storage solutions face a choice of either content quality or storage space. As such, these conventional solutions either elect to indiscriminately reduce content quality content, thereby reducing the space required to store the data, or they elect to retain content quality, thereby limiting the amount of data that may be stored in a cost-effective manner. Accordingly, an improved technique for processing multimedia data for storage or distribution would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving modifying multimedia content based on one or more rule sets associated with content characteristics. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

FIGS. 1-4 illustrate exemplary techniques for modifying multimedia content based on rule sets associated with one or more content characteristics. In at least one embodiment, multimedia data representing, for example, a program is received. Based on program information associated with the multimedia data, a rule template is identified. The rule template includes one or more rules, each rule being represented by, for example, a content characteristic and one or more content actions associated with the content characteristic. The rule template then is applied to the multimedia data so as to modify the multimedia data. In one embodiment, the rule template is applied by processing the multimedia data using some or all of the applicable rules of the rule template, where the multimedia content of the multimedia data is analyzed to determine if the content characteristics of one or more rules are present, and if so, one or more of the content actions associated with the identified content characteristics may be performed.

Figure 1:
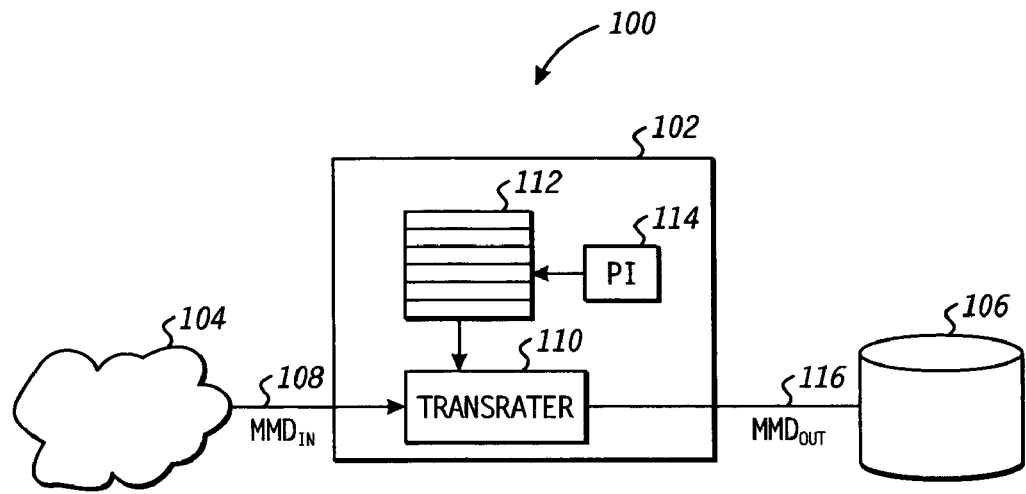
FIGS. 1 and 2 are block diagrams illustrating exemplary multimedia processing systems in accordance with at least one embodiment of the present disclosure.

Referring to FIG. 1, an exemplary multimedia processing system 100 is illustrated in accordance with at least one embodiment of the present disclosure. As exemplary depicted, the system 100 can include a multimedia processing device 102, a content provider 104 and one or more storage devices 106. The multimedia processing device 102, in one embodiment, includes a transrater 110 and a rules template database. Implementations of the multimedia processing device 102 may include, for example, a set top box, a personal versatile recorder (PVR), a television tuner card, a video card, and the like. The content provider 104 can include, for example, a satellite video feed, a cable television head in, a digital versatile disk (DVD) drive, and the like. The storage device 106 may include, for example, memory, a hard disc, a DVD drive, and the like.

In operation, the multimedia processing device 102 receives multimedia data 108 from the content provider 104, where the multimedia data may be provide in, for example, an MPEG data stream format. Program information 114 associated with the multimedia data 108 also can be provided with the multimedia data 108 or as a separate transmission. The program information 114 provides an indication or description of the programmatic details of the multimedia data 108. To illustrate, the multimedia data 108 may represent, for example, a particular football game and the program information 114 therefore can identify the multimedia data generally as a sports program, more particularly as a football program, and more specifically as, for example, a NFL® football program for a particular television network (e.g., Monday Night Football®). The program information 114 can include electronic program guide (EPG) information or information transmitted as closed captioning information during vertical blanking intervals.

Based on the program information 114, the transrater 110 identifies a particular rules template from the rules template database 112 that is applicable to the program type of the multimedia data 114. Using the example provided above, the rules template selected may be a rules template that is applicable to sports programs in general, a rules template that is applicable to football games, or a rules template that is applicable to the particular type of football game (e.g., a college football game or a football game program provided by a particular television network). After identifying the appropriate rules template, the transrater 110 analyzes one or more portions of the content of the multimedia data 108 to determine if one or more content characteristics identified by the rules of the rules template are present in an analyzed portion. To illustrate, the rules template can include a rule that provides that if the analyzed content portion includes a change in average audio volume that is greater than a given threshold (one example of a content characteristic), then the bit rate of the content portion is reduced by a provided amount (one example of a content action). This rule may be utilized, for example, to identify the presence of a commercial (which often is preceded by a change in volume), and if so present, the bit rate of the multimedia data representing the commercial content may be reduced so as to reduce the overall amount of multimedia data without materially affecting the multimedia content of the program that a viewer is likely to care about (i.e., non-commercial content).

If the content characteristic of an applied rule is present in the analyzed portion of the multimedia content, the transrater 110 may perform one or more content actions associated with the rule with respect to the multimedia content. For example, using the change-in-volume content characteristic described above, a corresponding content action can include, for example, a reduction in the bit-rate of the multimedia data representing the commercial content. As a result, the data representing the commercial content can be reduced without materially affecting the user's enjoyment of the program because users typically do not pay as much attention to commercials as they do the remainder of the program and the commercials therefore do not need to be of the same or similar quality as the rest of the program.

The transrater 110 thus can apply the rules template to the multimedia data by analyzing the multimedia content of the data in view of some or all of the rules of the template, thereby generating modified multimedia data 116 from the received multimedia data 108. The modified multimedia data 116 then may be provided for storage in the storage device 106 for subsequent access.

Figure 2:
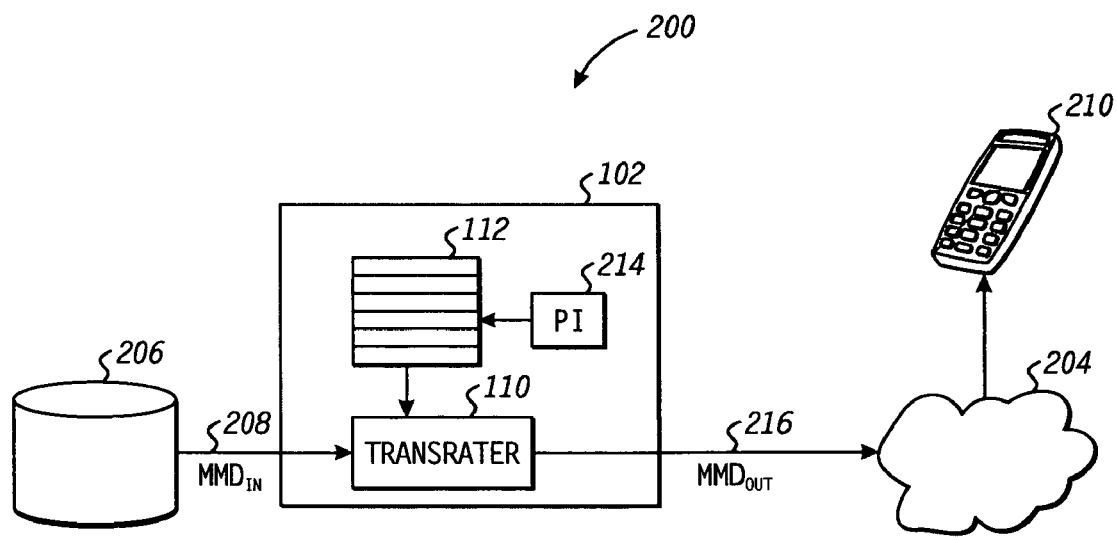

Referring to FIG. 2, another exemplary multimedia processing system 200 is illustrated in accordance with at least one embodiment of the present disclosure. As illustrated, the system 200 includes the multimedia processing device 102 having an input connected to a storage device 206 and an output connected to at least one multimedia device 210 via a network 204. In the illustrated example, the transrater 110 may access multimedia data 208 stored in the storage device 206, identify the appropriate rules template from the template database 112 using program information 214 associated with the multimedia data 208, and apply the identified template to the multimedia content of the multimedia data 208 to generate modified multimedia data 216 as described above. Further, in addition to, or instead of, providing the modified multimedia data 216 for storage in a local storage device, the modified multimedia data 216 may be transmitted for storage in the multimedia device 208 via the network 204, where the network 204 may include, for example, a wireless network, the Internet, a universal serial bus (USB), and the like. Accordingly, the modified multimedia data 216 subsequently may be accessed by the multimedia device for processing for display or for transmission to another device.

It will be appreciated that data storage limitations of the multimedia device 210 and/or bandwidth limitations of the network 204 may require additional consideration when transrating the input multimedia data 208 to generate the output modified multimedia data 216 so as to comply with these limitations. Accordingly, in at least one embodiment, the template database 112 may include templates indexed not only by, for example, program type, but also by one or more characteristics of the multimedia device 210 and/or the network 204. For example, a given news program may have a plurality of different rules templates that can be applied, where some rules templates are directed to portable multimedia devices that have limited storage and other rules templates are directed to multimedia devices or storage devices that have less limited storage or higher-bandwidth network connections. Those rules template directed to portable device can have, for example, rules that have more aggressive data-reducing content actions, whereas those rule templates directed to high-capacity devices can have, for example, rules that are less aggressive with respect to data-reduction and focus more on total image quality.

Table 1 below provides a non-limiting list of exemplary rules used to process the content of multimedia data.

TABLE 1

Exemplary Rule Sets

| Rule Name | Content Characteristic Description | Content Action(s) |
| --- | --- | --- |
| Commercial Detect | Change in average volume > threshold | Insert commercial index into multimedia data<br>Reduce bit rate for duration of identified commercial content<br>Reduce resolution for duration of identified commercial content |
| Score Change | OCR analysis of portion of image representing score box indicates change in text (and therefore change in score) | Increase audio volume of content for time period encompassing the score change<br>Increase bit-rate of content for time period encompassing the score change<br>Increase resolution of content for time period encompassing the score change |
| Goal | Audio content includes the voiced word "goal" | Increase bit rate of content for time period encompassing the goal |
| Game in Play | Detect time period having a yellow line in image frame indicating line of scrimmage in football game | Increase bit rate of content for time period |
| Talking Head Box | Unconditional | Decrease bit rate for screen portion used to display news anchor |
| Stock Ticker | Unconditional | Decrease resolution for screen portion used to display stock prices |

Figure 3:
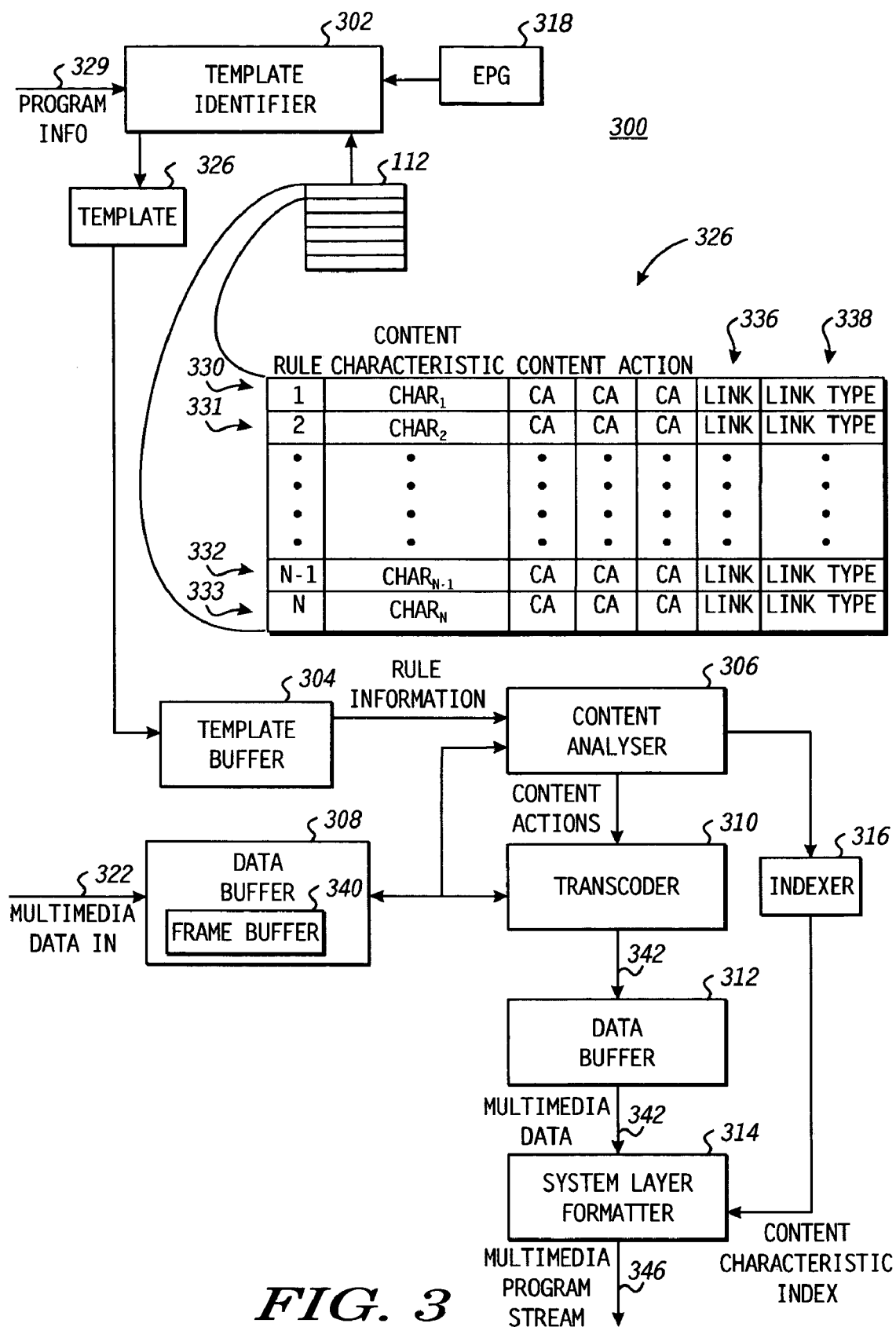
FIG. 3 is a block diagram illustrating an exemplary implementation of a transrating system in accordance with at least one embodiment of the present disclosure.

Referring to FIG. 3, an exemplary implementation of the transrater 110 of FIGS. 1 and 2 is illustrated in accordance with at least one embodiment of the present disclosure. The exemplary transrater 300 includes a rules table identifier module 302, a rules table buffer 304, a content analyzer 306, an input data buffer 308, a transcoder 310, an output data buffer 312, a system layer formatter 314 and an indexer 316.

In operation, multimedia data 322 is received and buffered in the input data buffer 308. Program information 324 associated with the input multimedia data 322 is provided to the table identifier module 302. Based on the program information 324, the table identifier 302 indexes the rules table database 112 to identify an appropriate rules table 326 to apply to the incoming multimedia data 322. The identified rules table 326 can be provided for storage in the table buffer 304 for use by the content analyzer 306. Alternately, an indicator (e.g., an address or pointer) to the identified rules table 326 may be provided to the content analyzer 306.

In at least one embodiment, the table identifier 302 has access to electronic programming guide (EPG) information 318 so that the table identifier 302 may identify one or more program types of the incoming multimedia data 322 and identify the rules table 326 accordingly. In at least one embodiment, multiple rules tables may be appropriately applied to the multimedia data 322. In such instances, the table identifier module 302 can select the more appropriate template to apply to the multimedia data 322, where the more appropriate template typically is the template aligned with the most specific program type. For example, the EPG information 318 may identify the incoming multimedia data 322 as being associated with a sports program in general and a soccer game program specifically. The table identifier module 302 therefore may identify a rules template associated with soccer game programs in particular. If such template is not available, the table identifier module 302 alternatively may select a rules template associated with sports programs in general.

Moreover, in one embodiment, when no rules template is identified based on specific program information, the table identifier 302 may select a default rules template. For example, if the multimedia data 322 represents a news broadcast from a particular television network for which there is no corresponding rules template in the template database 112, the table identifier module 302 may select a default template that may be generally associated with, for example, the type of multimedia device 210 that is expected to receive the resulting modified multimedia data.

An exemplary implementation of the rules template 326 is depicted by FIG. 3. As illustrated, some or all of the rules templates of the template database 112 may include one or more rules (e.g., rules entries 330-333, also identified as Rule 1-Rule N), each rule having a content characteristic descriptor (e.g., content characteristic descriptors $CC_1$-$CC_N$ for rule entries 330-333, respectively) and one or more content action descriptors (CA) associated with each content characteristic descriptor. The content characteristic descriptors typically represent a content characteristic which, if found in an analyzed content portion, results in the performance (or the avoidance of the performance) of one or more content actions represented by the one or more content action descriptors. The content characteristic descriptors typically include information describing a characteristic of the multimedia content (such as, for example, a descriptor indicating that if an optical character recognition analysis of the top portion of successive frames indicates that the score of a game has changed). The content characteristic descriptors may include, for example, microcode, a pointer to a memory location storing a routine for performing the one or more content actions, or information used in processing the multimedia data (such as, for example, a quantization scaling factor or a resolution scaling factor to be applied by the transcoder 310).

Each rule further may include a link field 336 to indicate if the rule is linked to any other links and a link type field 338 to indicate the type of link (e.g., an AND relationship or an OR relationship). For example, Rule 1 may be linked to Rule 2 in an AND relationship whereby if the content characteristic of Rule 1 is found the content characteristic of Rule 2 also must be found before the content actions of Rule 1 can be performed. As another example, Rule 1 may be linked to Rule 2 in an OR relationship whereby if the content characteristic of Rule 1 is identified as present in the analyzed content portion, Rule 2 is not to be applied to the content portion.

Although the exemplary rules described above have a condition (the presence of the content characteristic) before the corresponding one or more content actions can be performed, in at least one embodiment one or more of the rules may be unconditional rules whose content action(s) are always performed without a corresponding condition being met. For example, for multimedia content representing a new program, the image portion of successive frames that represents, for example, a stock ticker can be transrated so as to automatically reduce the image portion's resolution with an analysis of the content of the image portion.

The content analyzer 306, in one embodiment, analyzes the multimedia content of the multimedia data 322 in view of some or all of the rules of the rule template 326. Accordingly, in one embodiment, the content analyzer 306 obtains rule information from the table buffer 304 (or, alternatively, from the template database 112 directly) and analyzes the content of the multimedia data 322 to determine if content characteristics associated with the applied rules are present in one or more portions of the multimedia content.

In some instances, the content analyzer 306 can analyze the multimedia data 322 for certain content characteristics while the multimedia data 322 is in encoded form. To illustrate, an exemplary content characteristic to be identified can be an amount of motion between successive frames that is greater than a certain threshold. In this case, the content analyzer 306 may analyze, for example, the motion vector information of the encoded multimedia data 322 to determine if there is substantial motion between image frames. However, in other instances, identifying certain content characteristics can require that the multimedia data 322 be in decoded form. For example, in one embodiment the content characteristic may be the identification of the word "goal" in the audio content of the multimedia data 322. In this case, the content analyzer 306 typically would access decoded audio information to perform an audio analysis for the word "goal". Accordingly, the transcoder 310 may decode some or all of the multimedia data 322 and store the decoded multimedia data in a frame buffer 340 (exemplary illustrated as part of the data buffer 308). The content analyzer 306 then may access the decoded multimedia data in the frame buffer 340 to perform the content analysis.

The portion of the content of the multimedia data 322 analyzed for any particular content characteristic typically is dependent on the particular characteristic. To illustrate, the content characteristic of a change in displayed text representing, for example, a score or a stock value may be identified by an OCR analysis of a certain segment of two successive image frames. Thus, the content portion for this characteristic would be two or more frames. As another example, the content characteristic may be the presence of a yellow line indicating the line of scrimmage in a football game. In this instance, the yellow line may be detected by analyzing a particular portion of a single image frame (e.g., the center column of an image frame). In this case, the analyzed content portion can include the center column of the image frame.

In the event that the content analyzer 306 detects that a content characteristic of a rule is present in an analyzed portion of the multimedia data 322, the content analyzer 306 provides the transcoder 310 an indication of the one or more content actions to be performed. The transcoder 310 then processes some or all of the multimedia data 322 in accordance with the content actions to generate modified multimedia data 342. The multimedia data 342 then may be stored in the outgoing data buffer 312 before it is formatted for transmission as, for example, an MPEG program stream 346 by the system layer formatter 314.

In at least one embodiment, a content action to be performed includes embedding a content characteristic index in the modified multimedia data 342, where the content characteristic index identifies the corresponding portion of multimedia data 342 as representing multimedia content having the indicated content characteristic. For example, the content analyzer 306 may analyze the audio content of the multimedia data 322 to identify rapid increases in the average volume of the audio. In the event that such an average volume increase is found, the corresponding content action can include inserting a content characteristic that identifies the multimedia data portion representing, for example, the next thirty seconds of content as a commercial. Thus, the multimedia data 342 subsequently can be rapidly searched to identify the data associated with commercial content and this content may be filtered by, for example, removing the commercial content, reducing the audio volume of the commercial content, reducing the resolution and/or bit rate of the commercial content, and the like. Alternately, the content action can include the creation of a separate index table to a location of the commercial content.

Accordingly, upon identifying a content characteristic present in a portion of the multimedia content that has a corresponding content index action, the content analyzer 306 may provide index information to the indexer 316 which then manages the insertion of the appropriate content characteristic index into the multimedia data 341 using, for example, the system layer formatter 314.

Figure 4:
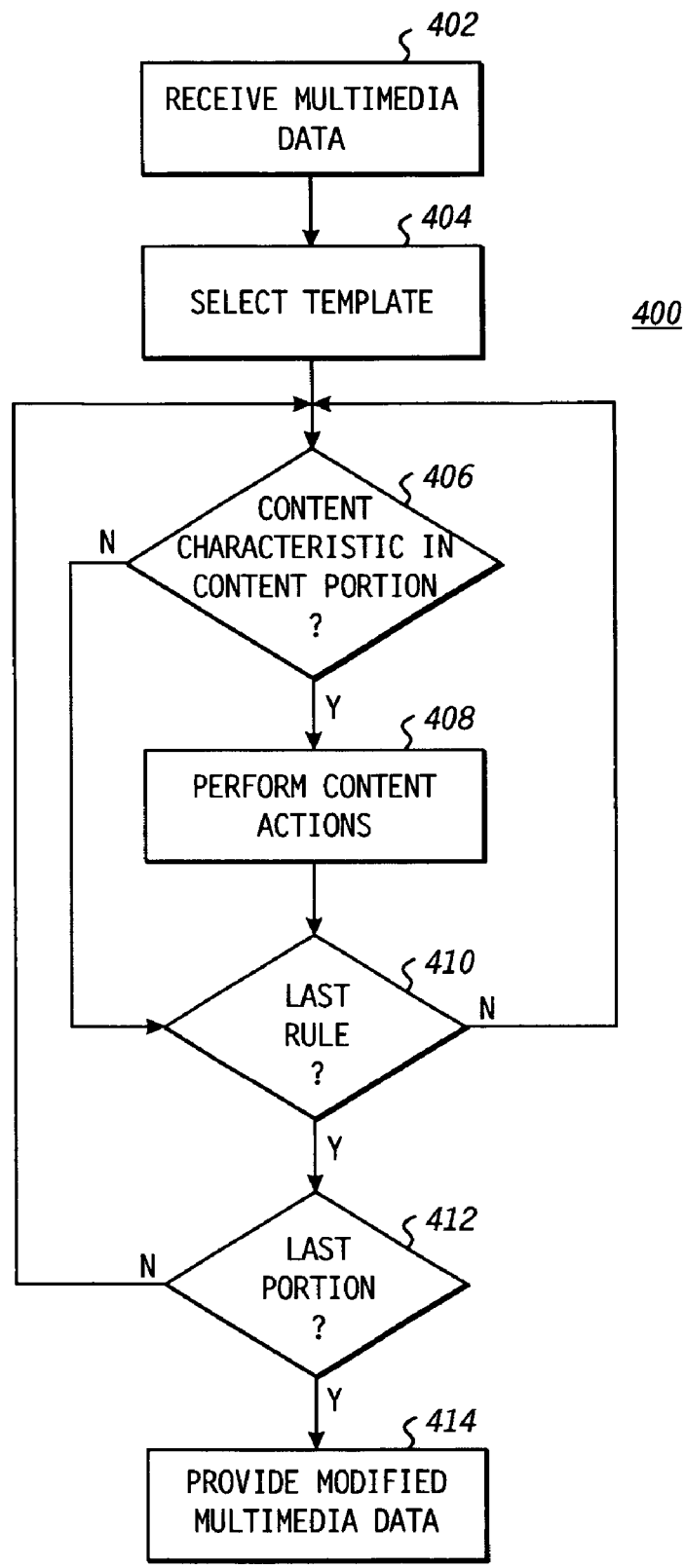
FIG. 4 is a flow diagram illustrating an exemplary method for dynamic transrating in accordance with at least one embodiment of the present disclosure.

Referring to FIG. 4, an exemplary dynamic transrating method 400 is illustrated in accordance with at least one embodiment of the present disclosure. The method 400 initiates at step 402 whereby multimedia data is received and temporarily buffered. At step 404, the appropriate rules template for the multimedia data is selected based on program information, such as, for example, program type, associated with the multimedia data. As noted above, there can be a number of rules templates appropriate for application to the multimedia data. In such instances, the rules template more aligned with the program characteristics (e.g., a rules template specifically for a football game rather than a general sports program template) is selected. In the event that a specific rules template is not available or appropriate, in one embodiment a default general rules template may be selected.

At step 406, a rule from the selected rules template is accessed and a portion of the content of the multimedia data is analyzed to determine whether the content characteristic associated with the rule is present in the analyzed content portion. If the content characteristic is not present in the analyzed content portion, the method 400 continues to step 410. Otherwise, when the content characteristic is present, one or more of the content actions associated with the rule are performed at step 408. In one embodiment, rules may be linked using logical operations such as AND operations and/or OR operations. Accordingly, if so linked, the content actions of the rule may not be performed at step 408 until the conditions of other linked rules are confirmed.

At step 410 the rules template is checked to determine if the last rule to be applied has been applied. If not, the method 400 repeats steps 406-410 for the next rule to be applied. If it is determined at step 412 that content portions of the multimedia data have yet to be analyzed, the method 400 repeats steps 406-410 to apply the appropriate rules to the next multimedia content portion to be analyzed.

At step 414 the resulting modified multimedia data is provided for storage in a storage device, such as a hard disc or a DVD disc, or provided for transmission to one or more multimedia devices, such as a cellular phone or PDA, via a network. As a result, the original multimedia data may be modified so as to reduce its size while retaining suitable content quality.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    receiving, using a multimedia processing device, multimedia data representing multimedia content of a program;
    identifying a select template of a plurality of templates based on the program using the multimedia processing device, wherein the select template comprises a plurality of rules, each rule comprising a characteristic and one or more actions to be performed by multimedia processing device in association with the characteristic, the one or more actions comprising at least one action selected from a group consisting of: changing a bit rate of the multimedia data; changing a resolution of the multimedia data; and changing an audio volume of the multimedia data;
    analyzing the multimedia content using the multimedia processing device to determine characteristics of the multimedia content; and
    modifying, using the multimedia processing device, the multimedia data based on an application of the plurality of rules of the select template to the characteristics of the multimedia content.

2. The method of claim 1, wherein the select template is identified based on received program information associated with the multimedia data and wherein the program information includes electronic programming guide information.

3. The method of claim 1, wherein the application of the plurality of rules of the select template to the characteristics of the multimedia content comprises:
    determining, for each rule of at least a subset of the rules, whether a portion of the multimedia content has a characteristic associated with the rule; and
    performing one or more actions associated with the rule to modify the received multimedia data when the portion of the multimedia content is determined to have the characteristic associated with the rule.

4. The method of claim 3, wherein the one or more actions further include an action to insert an identifier into a portion of the multimedia data associated with the portion of the multimedia content, the identifier identifying the portion of the multimedia content as having the characteristic.

5. The method of claim 1, wherein:
    the multimedia content comprises audio content; and
    analyzing the multimedia content comprises performing an audio analysis of the audio content using the multimedia processing device to determine whether the audio content has at least one of a change in volume or a select sound.

6. The method of claim 1, wherein:
    the multimedia content comprises video content; and
    analyzing the multimedia content comprises performing an optical character recognition analysis of the video content using the multimedia processing device to determine whether the video content has at least one of the characteristics.

7. The method of claim 1, wherein:
the multimedia content comprises video content; and
analyzing the multimedia content comprises performing a motion detection analysis of the video content using the multimedia processing device to determine whether the video content has at least one of the characteristics.

8. The method of claim 1, wherein modifying the multimedia data based on the application of the plurality of rules of the first template to the characteristics of the multimedia content comprises:
analyzing the multimedia content to determine the multimedia content has a select characteristic of a select rule of the plurality of rules; and
changing a bit rate of the multimedia data using the multimedia processing device responsive to determining the select rule comprises an action of changing a bit rate.

9. The method of claim 1, wherein modifying the multimedia data based on the application of the plurality of rules of the first template to the characteristics of the multimedia content comprises:
analyzing the multimedia content to determine the multimedia content has a select characteristic of a select rule of the plurality of rules; and
changing a resolution of the multimedia data using the multimedia processing device responsive to determining the select rule comprises an action of changing a resolution.

10. The method of claim 1, wherein modifying the multimedia data based on the application of the plurality of rules of the first template to the characteristics of the multimedia content comprises:
analyzing the multimedia content to determine the multimedia content has a select characteristic of a select rule of the plurality of rules; and
changing a volume of the multimedia data using the multimedia processing device responsive to determining the select rule comprises an action of changing a volume.

11. The method of claim 1, wherein:
the plurality of rules comprises a select rule comprising a characteristic representing a commercial and an action of at least one of temporarily changing a bit rate or temporarily changing a resolution;
analyzing the multimedia content to determine characteristics of the multimedia content comprises analyzing the multimedia content to determine a portion of the multimedia content has the characteristic representing a commercial; and
modifying the multimedia data based on the application of the plurality of rules of the select template to the characteristics of the multimedia content comprises identifying the select rule for application to the multimedia content so as to change at least one of a bit rate or a resolution for a portion of the multimedia data that represents the portion of the multimedia content.

12. A system comprising:
an interface to receive multimedia data having multimedia content;
a template identification module to identify a select template associated with the multimedia data, wherein the select template comprises a plurality of rules, each rule comprising a characteristic and one or more actions associated with the characteristic, the one or more actions comprising at least one action selected from a group consisting of: changing a bit rate of the multimedia data; changing a resolution of the multimedia data; and changing an audio volume of the multimedia data;
a content analyzer operably coupled to the interface and the template identification module, the content analyzer to analyze the multimedia content to determine, for each rule of at least a subset of the rules of the select template, whether a portion of the multimedia content has a characteristic associated with the rule; and
a transcoder operably coupled to the interface and the content analyzer, the transcoder to perform at least one action of the one or more actions associated with the rule so as to modify the multimedia data when the portion of the multimedia content is determined to have the characteristic associated with the rule.

13. The system of claim 12, wherein the template identification module identifies the select template based on received program information associated with the multimedia data.

14. The system of claim 12, wherein the one or more actions further include an action to insert an identifier into the portion of the multimedia data, the identifier identifying the portion of the multimedia content as having the characteristic associated with the rule.

15. The system of claim 12, wherein:
the characteristic associated with the rule comprises at least one of a change in volume or a select sound;
the portion of the multimedia content comprises audio content; and
the content analyzer is to determine whether the portion of the multimedia content has the characteristic associated with the rule by performing an audio analysis of the audio content.

16. The system of claim 12, wherein:
the portion of the multimedia content comprises video content; and
the content analyzer is to determine whether the portion of the multimedia content has the characteristic associated with the rule by performing an optical character recognition analysis of the video content.

17. The system of claim 12, wherein:
the portion of the multimedia content comprises video content; and
the content analyzer is to determine whether the portion of the multimedia content has the characteristic associated with the rule by performing a motion detection analysis of the video content.

18. The system of claim 12, wherein the one or more actions comprise one of changing a bit rate of the multimedia data or changing an audio volume of the multimedia data.

* * * * *